VIBRATORY REED SIGNALING DEVICE

Filed Jan. 15, 1948

INVENTOR.
WILLIAM J. MULDOON
BY Kenway Jenney Witter & Hildreth
ATTORNEYS

Patented Dec. 5, 1950

2,533,136

UNITED STATES PATENT OFFICE 2,533,136

VIBRATORY REED SIGNALING DEVICE

William J. Muldoon, Garden City, N. Y., assignor to The Wheeler Insulated Wire Company, Incorporated, Bridgeport, Conn., a corporation of Delaware Application January 15, 1948, Serial No. 2,500

5 Claims. (Cl. 177—341)

The present invention relates to signaling devices and more particularly to a ringing device for a point-to-point batteryless telephone system.

In my copending application, Serial No. 670,585 filed May 17, 1946, now Patent No. 2,523,775, dated Sept. 26, 1950, I have described an inexpensive and efficient sound powered transducer, which is especially suitable for toy telephones, inter-office units, farm telephone systems and the like. In my application, Serial No. 711,505 filed November 22, 1946, now Patent No. 2,492,056, dated Dec. 20, 1949, I have described a ringing unit for telephones of that general type. The particular form of ringing units there described is especially designed for use in a toy telephone and where only a small amount of power may be required.

The object of the present invention is to provide a ringing unit of the general type described in my last named copending application but arranged to provide a more powerful signal.

With this object in view and other objects as will hereinafter appear, the present invention comprises the various combinations and arrangements of parts hereinafter particularly described and claimed.

Figures 1, 2, 5, 6:
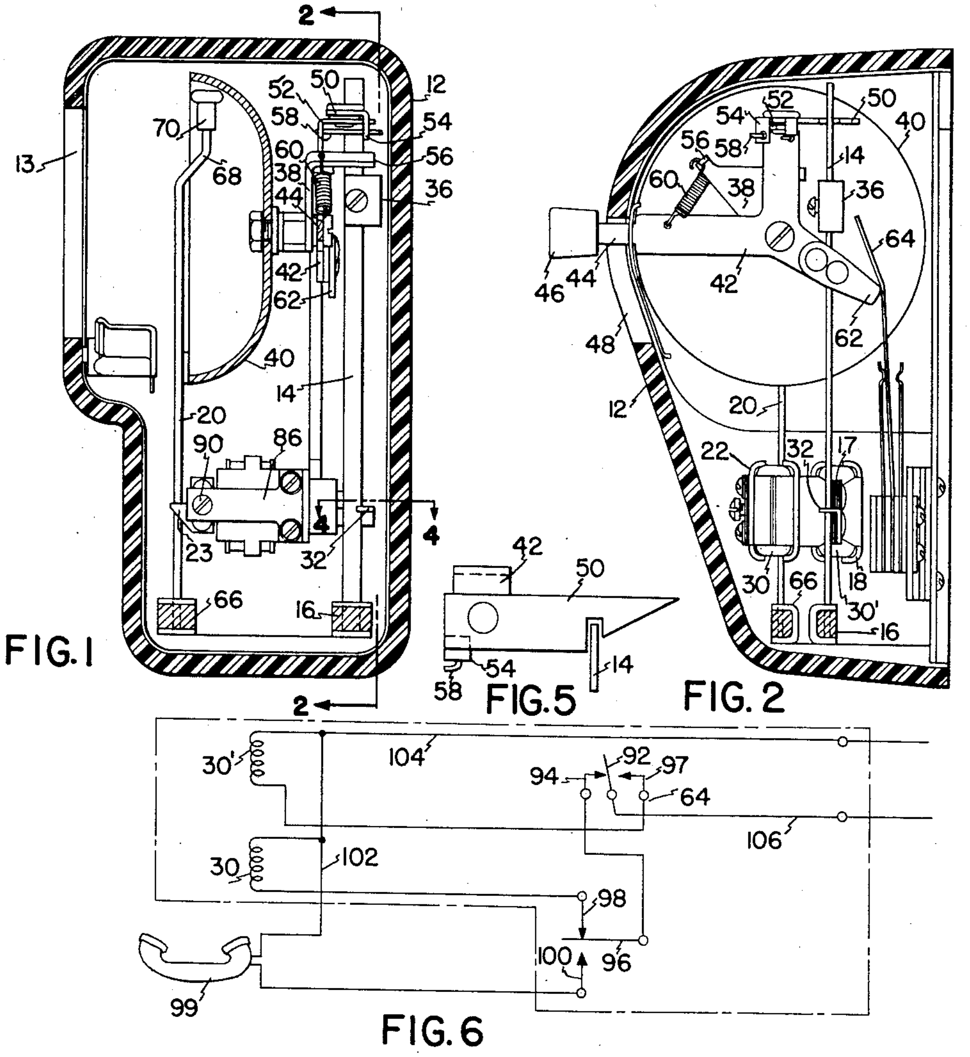
Figure 3:
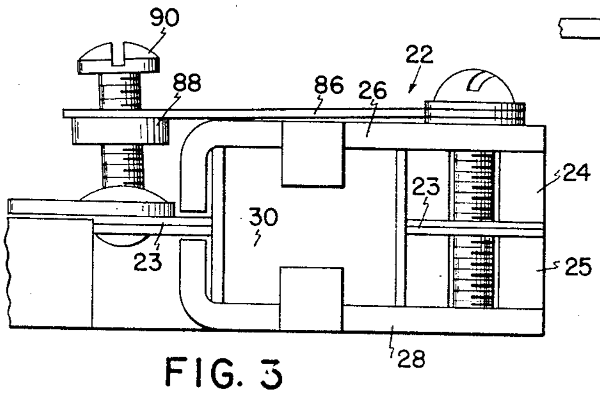
Figure 4:
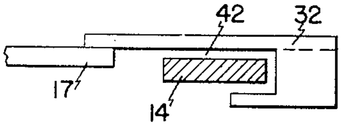

In the accompanying drawings, Fig. 1 is a side elevation of a signaling unit according to the present invention; Fig. 2 is a sectional elevation on line 2—2 of Fig. 1; Fig. 3 is an enlarged detail view of the receiving transducer; Fig. 4 is an enlarged sectional view of line 4—4 of Fig. 1; Fig. 5 is a detail view of the reed release; and Fig. 6 is a wiring diagram for a signaling system.

In the illustrated embodiment of the invention, the complete set for one station comprises a telephone handset (shown in the diagram of Fig. 6) which may be of any suitable form, and a casing 12 having an opening 13 into which the ear piece of the handset may be received. The casing 12 encloses the bell and other parts of the ringing unit as will now be described.

Within the casing is a generator ringing unit comprising a vibrating reed 14, preferably in the form of a flat resilient strip of metal anchored at one end in a bracket 16. The reed 14 is coupled to the armature 17 of a transducer 18. Also enclosed in the casing 12 is a bell-ringing reed 20 adapted to be driven by a second transducer 22, here designated as the receiving transducer. The armature of the transducer 22 is shown at 23. As shown in detail in Fig. 3, each transducer is of the general form described in my copending application, Serial No. 670,585, Patent No. 2,523,775. Fig. 3 shows the details of the receiving transducer 22. It comprises two permanent magnets 24 and 25 in series in the magnetic circuit, with the armature 23 between them. Two pole pieces 26 and 28 are secured to the magnets and their ends are closely adjacent to the armature whereby small air gaps are formed. The armature is surrounded by a coil 30 which carries the signal current. The transducer shown in Fig. 3 also includes means for biasing the armature, which is used only on the receiving unit and will be referred to later. Referring now to the generating transducer, it has a winding 30′ and its armature 17 is coupled with the reed 14 through a yoke 32. As shown in Fig. 4, the yoke is attached to the armature and it has a projecting portion with a slot 42 within which the reed 14 is received. Preferably the reed is not tightly received in the slot but there is a slight looseness for reasons to be explained later. It will be seen that upon vibration of the reed 14 the armature 17 is vibrated and a signal current at the frequency of vibration is generated in the coil. It has been found that the best resonant frequency is in the neighborhood of 60 cycles per second and for this purpose the reed is preferably of spring steel having a free length of about 5 inches, a width of $\frac{3}{16}''$ and a thickness of .045″. A weight 36 may be mounted on the reed for a purpose to be described later.

Received within the casing is a bracket 38 which serves to mount the bell 40. Pivoted on the bracket 38 is a bell crank lever 42 having an arm 44 extending outwardly through the casing and carrying a manual operating button 46. Upon depression of the button to carry the arm 44 down through the slot 48 in the casing, the bell crank is rocked. The arm 42 carries at the top a latching pawl 50 which extends over the reed 14 to exert a pulling motion thereon as shown in Fig. 5. The pawl is pivoted on a ledge 52 extending horizontally from the top of the bell crank lever. The pawl is provided with a tail 54 which is adapted to engage a projection 56 extending outwardly from the bell mounting bracket 38 when the bell crank approaches the limit of its movement. The pawl is normally held in its latching position by a wire spring 58. A coil spring 60 connected between the bell crank and the mounting bracket normally tends to hold the bell crank in its upward position. Upon depression of the button 46, the pawl 50 flexes the reed 14 until the tail 54 of the pawl engages the projection 56 whereupon the pawl is turned to release the reed. The reed then undergoes a sharp powerful series of vibrations and causes generation of a signal voltage in the coil 30' through the vibration of the armature 17.

The bell crank lever 42 is provided with a third arm 62 to operate a switch 64 which will be described later. The switching arrangement is such that the winding 30' of the generating unit at the transmitting station is connected to the winding 30 of the receiving unit at the receiving station, whereby the reed 20 of the receiving unit is vibrated synchronously with the reed 14 of the transmitting unit.

It has been found that the ringing level is improved by permitting the reed 14 to store up energy for a portion of its vibrating cycle and then discharge the energy rapidly into the magnetic system whereby a sharply peaked wave form of voltage is obtained. This results in a high acceleration of the receiver reed by which the ringing is accomplished at the receiving station. This result is accomplished by providing the small amount of looseness in the coupling 42 between the yoke 32 and the reed 14, which has been previously referred to in connection with Fig. 4.

Referring now to the receiver unit, it is in general similar to the transmitter unit heretofore described. The receiver unit includes the bell 40 and the vibratory reed 20, the latter being anchored as indicated at 66. The reed is formed at its upper end with a suitable bent portion 68 entering within the bell 40 and carrying a hammer 70.

The reed is operated by the transducer 22, which has already been partially described in connection with Fig. 3. It has been found that greater ringing force is obtained by biasing the receiver armature to a point just short of that where the armature would strike one of the pole pieces. The reason for this will be explained presently. The means for obtaining the bias is preferably as follows: An adjusting spring 86, which is a piece of flat metal, is secured at one end to the pole pieces and at the other end to a block 88 through which passes an adjustment screw 90 bearing on the armature 23. By turning the adjustment screw 90 the required amount the armature can be biased toward one of the pole pieces in any suitable degree.

The reason for the improved operation with the biased armature is that the force on the armature is proportional to the product $\phi_p$ and $\phi_{ac}$, where $\phi_p$ is the air gap flux due to the permanent magnets and $\phi_{ac}$ is the alternating flux due to the signal current in the windings. When the armature is biased toward one side, both $\phi_p$ and $\phi_{ac}$ are increased through one pole piece, and decreased through the other. A complete analysis shows the effect of the increased $\phi$'s due to greater proximity to one pole piece considerably overbalances the decreased $\phi$'s due to the larger distance from the other pole piece.

It will be understood that a sufficient overall air gap must always be provided to take care of minimum economical tolerances and to insure against large performance variations and critical adjustment of the armature in the gap. The biasing of the armature as herein described shortens one of the air gaps and the resultant effect is not unlike what would be obtained if the unit were originally constructed with air gaps of the diminished amount on both sides of the armature. However, it would be difficult to construct such a unit and to adjust the armature for optimum performance. The biasing arrangement herein shown allows the armature to be adjusted to the optimum setting; in other words, for a given overall air gap, a maximum ringing force is obtained by biasing the armature toward one side.

Another feature of importance is that of using a relatively massive vibrating element for the generator and a relatively light one for the receiver. Thus the generating reed has the weight 36, which contributes to the mass of the vibrating system, while the mass of the receiving system is preferably less. Since the vibrating systems of the generator and receiver are to resonate at the same frequency, this requires that the elastance of generating reed 14 be greater than that of the receiving reed 20; in other words, the reed 14 is necessarily stiffer than the reed 20. In such a case the energy is approximately proportional to the mass; accordingly, the generating reed can store a large amount of energy, while the receiving reed does not withdraw much energy from the system. Thus both reeds can vibrate for a longer time than if they were of the same characteristics.

The preferred wiring diagram is shown in Fig. 6. The switch 64 which is operated by the arm 62 of the bell crank has a movable contact normally closed on a fixed contact 94 which is connected in series with the movable contact 96 of a hook switch. The contact 92 is adapted to close on a contact 97 when the button 46 is depressed. The contact 96 is closed on a contact 98 when the handset 99 is supported by the casing 12 and is adapted to close on the contact 100 when the handset is removed. One line 102 is connected to the windings 30 and 30' and to the handset. The other ends of the windings 30 and 30' are connected to the contacts 98 and 97 respectively. The contact 100 is connected with the handset and the contact 92 is connected with the line 106.

Upon depression of the button 46, the generator winding 30' is connected to the line by reason of the closure of contact 92 on 97. Contacts 92 and 97 remain closed during the vibration of the reed 14. At the receiving end, however, the winding 30 is connected to the line through contacts 98, 96 and 94, 92. The proper windings of the two units are thus connected together, whereby the bell is caused to ring at the receiving station by reason of vibration of the reed 20. Upon lifting of the handsets 99 at both ends, both hook switches are closed at 96, 100, and since contact 92 is then closed on 94, the handsets are connected together through the lines for ordinary telephonic conversation.

It will be seen that the construction is in general similar to that used in the ringing device described in my application Serial No. 711,505. However, it differs in some respects. Among other things, it has been found desirable to use separate transmitting and receiving units since both can be then constructed for maximum ringing energy, as heretofore described. With the apparatus herein described, it has been found possible to obtain a substantial volume of ringing with only the energy that can be introduced by operation of the button 46. As heretofore stated, the unit is particularly suitable for point-to-point communication in batteryless systems and is found particularly useful in farm units where house-to-barn or house-to-field communication is desired.

Having thus described the invention, I claim:

1. A signaling device comprising a vibratory reed, means for flexing and releasing the reed, a transducer having an armature to be vibrated by the reed, and a loose mechanical connection between the reed and the armature.

2. A signaling device comprising a vibratory reed, means for flexing the reed including a manually operable lever, a latch to release the reed when the latter is flexed, a transducer having an armature, and a loose mechanical connection between the reed and the armature.

3. A signaling device comprising a vibratory reed, a lever for flexing the reed, latch means for releasing the flexed reed, a switch operated by the lever, and a transducer having an armature to be vibrated by the reed.

4. A signaling device comprising a vibratory reed, a lever for flexing the reed, latch means for releasing the flexed reed, line terminals, a transducer for generating electrical energy upon vibration of the reed, said transducer having a winding, and a switch operated by the lever to connect the winding to said line terminals during the vibration of the reed.

5. A signaling instrument comprising a generating transducer and a receiving transducer contained in a single unit, each transducer having permanent magnets, an armature, and a vibratory reed connected with the armature, the reeds of the two transducers having substantially the same resonant frequency, the reed of the generating transducer being stiffer and more massive than the reed of the receiving transducer.

WILLIAM J. MULDOON.

REFERENCES CITED

The following references are of record in the file of this patent:

UNITED STATES PATENTS

| Number | Name | Date |
|---|---|---|
| 372,404 | Deprez | Nov. 1, 1887 |
| 1,098,834 | Oliver | June 2, 1914 |
| 1,254,658 | Clausen | Jan. 29, 1918 |
| 1,749,175 | Albright | Mar. 4, 1930 |
| 2,192,216 | Woodruff | Mar. 5, 1940 |
| 2,389,247 | Dowey | Nov. 20, 1945 |